Oct. 12, 1926.

W. D. BAYLEY 1,602,388

EXTENSION FOR SILOS

Filed Sept. 11, 1925

William D. Bayley INVENTOR
BY
ATTORNEYS

Patented Oct. 12, 1926.

1,602,388

UNITED STATES PATENT OFFICE.

WILLIAM D. BAYLEY, OF SPRINGFIELD, OHIO.

EXTENSION FOR SILOS.

Application filed September 11, 1925. Serial No. 55,836.

This invention relates to silos, particularly silos of the metallic type, and it especially relates to an extension for the top of the silo.

The object of the invention is to provide a construction of cheap and simple form for the top of the silo which can be filled with ensilage in a quantity to compensate for the natural settling or slump of the ensilage in the silo proper so that the silo may be completely filled with ensilage after the ensilage has settled or slumped therein.

Referring to the drawings.

Figure 1:
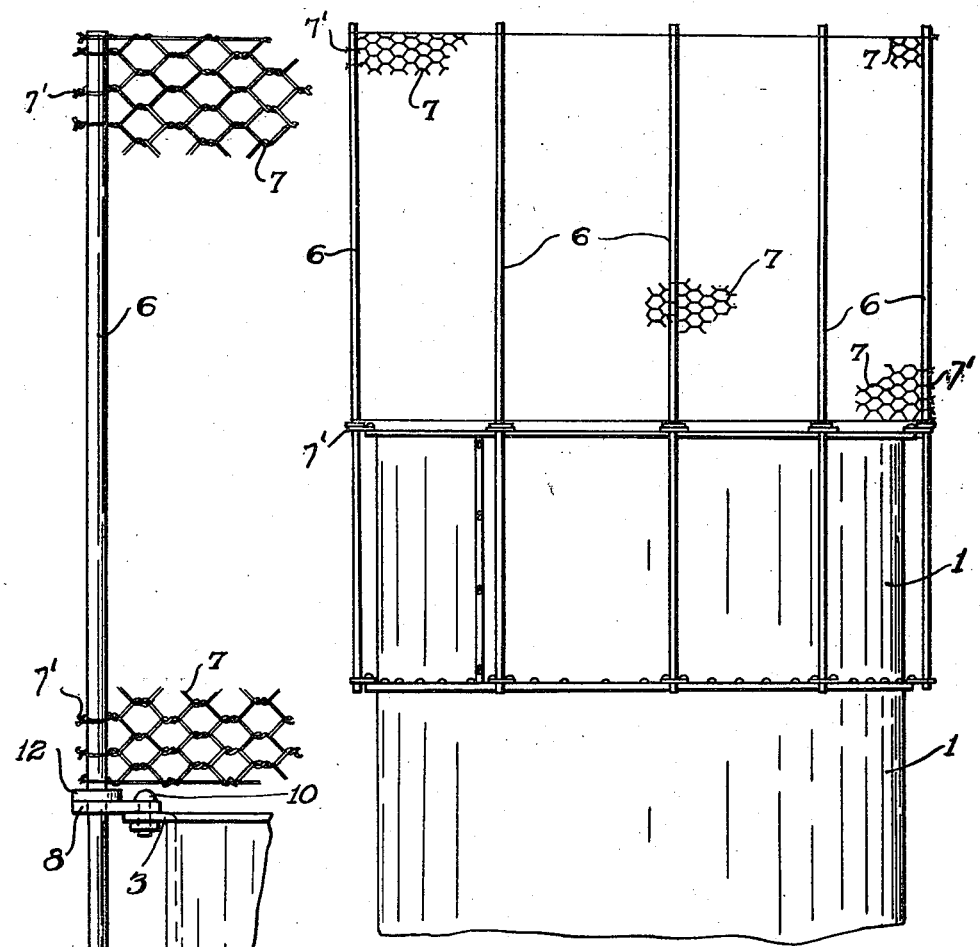
Fig. 1 is a side elevation of the upper portion of metallic silo showing the improved extension applied thereto.
Figure 2:
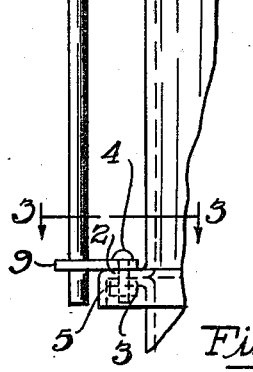
Fig. 2 is a side elevation of a portion of the parts shown in Fig. 1.
Figure 3:
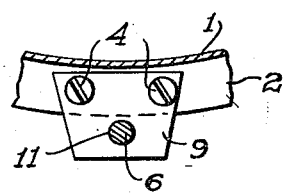
Fig. 3 is a section on the line 3—3 of Fig. 2.

Ensilage placed in silos settles or slumps therein to a considerable degree so that if the silo is initially filled to the top the ensilage will eventually settle to such a degree that there is considerable lost space at the top of the silo. To obviate this I provide a construction of cheap and simple form which can be applied to the top of the silo and extend a considerable distance from above to receive ensilage in a quantity to compensate for the slump or settlement of the ensilage which has been placed in the silo. The silo which is shown in the drawings is one of well known form constructed of a series of sheetmetal rings, each ring being formed of a series of sections of sheetmetal having their vertical edges joined together in a well known way. The upper and lower edges of each ring have outturned flanges 2 and 3 connected together by bolts 4, the flange 2 preferably have a depending apron 5 as a guard against weather.

The extension is of skeleton form and consists of a series of metallic rods thus supported on the upper portion of the silo and projecting a suitable distance above the top thereof those portions of the rods which project above the silo carrying a wall 7 formed of coarse wire mesh which is secured to the rods by wires 7'.

To support the extension there is secured to the flanges 2 and 3 of the upper silo ring 1 plates 8 and 9. The same bolts 4 which secure the flanges 2 and 3 together are employed for securing the flanges 9 in position and bolts 10 are employed for securing the plate 8 to the flange 3. Each of these plates is perforated as indicated at 11 to receive the rods 6 and to support the rods there is welded to each rod a collar 12 which rests upon the corresponding plate 8.

By this arrangement a very cheap and simple construction is provided which may be filled with ensilage after the silo has been filled to an extent that after the ensilage has settled in the silo the silo will be completely filled with ensilage, thus utilizing all the space therein. Another advantage of this arrangement is that in the event it is desired to add one or more additional sections to the silo, this can be readily done by removing the extension and then applying the extension to the upper one of the new sections.

Having thus described my invention, I claim:

1. In a silo of the character described, a combination, with the silo, of a removable extension of skeleton form for the top of said silo, said extension consisting of a plurality of vertical supporting rods each removably connected with the upper end of the silo and a cylindrical body of wire mesh connected with and supported by said rods, whereby the extension consisting of rods and wire may be removed from said silo to permit an additional section to be added to said silo.

2. In a silo, the combination with a silo formed of metallic rings having outturned lateral flanges to secure the rings together, of an extension consisting of a series of rods removably supported by the flanges of the upper ring and projecting above said ring, and an enclosure secured to those portions of the rods above said ring.

3. In a silo, a silo formed of metallic rings having outturned lateral flanges to secure said rings together, of an extension consisting of a series of rods, plates on the flanges of the upper ring for supporting said rods, and an enclosure secured to those portions of said rods above said upper rings.

4. In a silo, the combination with a metallic silo formed of sheetmetal rings having upper and lower outturned lateral flanges for securing said rings together, of an extension consisting of a series of rods, a series of plates secured to the upper and lower flanges of the upper rings apertured to receive said rods, and a collar upon each of said rods, said collars being seated upon the upper plates, and an enclosure of wire mesh secured to those portions of the rods above said upper ring.

5. In a silo, the combination with the silo, of a removable extension consisting of a series of rods removably supported in a vertical position only by the upper portion of the silo and projecting above the same, and an enclosure of wire mesh secured to said rods above said silo.

6. In a silo, the combination with a metallic silo formed of a series of rings having outturned flanges for the purpose of securing said rings together, of a series of rods removably supported by said flanges and projecting above the upper ring of the silo, and an enclosure consisting of wire mesh secured to those portions of the rods which extend above the silo.

In testimony whereof, I have hereunto set my hand this 27th day of August, 1925.

WILLIAM D. BAYLEY.